US011190967B2

(12) United States Patent
    Jiang

(10) Patent No.: US 11,190,967 B2
(45) Date of Patent: Nov. 30, 2021

(54) DOWNLINK DATA PACKET CONFIGURATION METHOD AND DEVICE

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/633,156

(22) PCT Filed: Nov. 14, 2017

(86) PCT No.: PCT/CN2017/110944
§ 371 (c)(1),
(2) Date: Jan. 22, 2020

(87) PCT Pub. No.: WO2019/019486
PCT Pub. Date: Jan. 31, 2019

(65) Prior Publication Data
US 2021/0160727 A1 May 27, 2021

(30) Foreign Application Priority Data
Jul. 25, 2017 (WO) ............... PCT/CN2017/094407

(51) Int. Cl.
    H04W 28/02    (2009.01)
    H04L 12/851   (2013.01)
    H04W 28/12    (2009.01)

(52) U.S. Cl.
    CPC ..... H04W 28/0263 (2013.01); H04L 47/2483 (2013.01); H04W 28/0268 (2013.01); H04W 28/12 (2013.01); H04L 2212/00 (2013.01)

(58) Field of Classification Search
    CPC ............ H04W 28/02; H04W 28/0252; H04W 28/0263; H04W 28/0268; H04W 72/1263; H04W 72/1268; H04W 72/1273
    See application file for complete search history.

(56) References Cited

U.S. PATENT DOCUMENTS

2014/0233380 A1    8/2014 Kim et al.
2015/0063101 A1    3/2015 Touati et al.
                   (Continued)

FOREIGN PATENT DOCUMENTS

CN    102612095 A    7/2012
CN    103096314 A    5/2013
                   (Continued)

OTHER PUBLICATIONS

Extended European Search Report of counterpart EP Application No. 17919504.5 dated Jun. 9, 2020, (14p).
(Continued)

Primary Examiner — Pao Sinkantarakorn
(74) Attorney, Agent, or Firm — Arch & Lake LLP

(57) ABSTRACT

Provided is a downlink data packet configuration method comprising: determining a target data radio bearer (DRB) corresponding to a downlink data packet to be sent; determining, according to a configured correspondence between a DRB and a downlink processing attribute, a target downlink processing attribute corresponding to the target DRB; encapsulating the downlink data packet with adding a service data adaptation protocol (SDAP) header when the target downlink processing attribute is an attribute of supporting the NAS reflective QoS function or the AS reflective QoS function; and encapsulating the downlink data packet without adding an SDAP header when the target downlink
(Continued)

processing attribute is an attribute of neither supporting the NAS reflective QoS function nor the AS reflective QoS function.

20 Claims, 8 Drawing Sheets

(56) References Cited

U.S. PATENT DOCUMENTS

| | | | |
|---|---|---|---|
| 2015/0071059 A1 | 3/2015 | Fu et al. | |
| 2015/0257159 A1 | 9/2015 | Speicher et al. | |
| 2018/0213540 A1* | 7/2018 | Chiu | H04L 69/22 |
| 2018/0324631 A1* | 11/2018 | Jheng | H04L 1/1887 |
| 2019/0028920 A1* | 1/2019 | Pan | H04L 47/24 |
| 2019/0150023 A1* | 5/2019 | Cho | H04W 28/02 |
| | | | 370/235 |

FOREIGN PATENT DOCUMENTS

| | | | |
|---|---|---|---|
| WO | 2013062363 A1 | 5/2013 | |
| WO | 2013064070 A1 | 5/2013 | |

OTHER PUBLICATIONS

Convida Wireless, "SDAP Header Format", 3GPP TSG-RAN Wg2 NR Ad Hoc, R2-1707351, Quingdao, China, Jun. 26, 2017, (5p).

Ericsson, "QoS Flow Remapping Within the Same Cell and in Handover", 3GPP TSG-RAN WG2 #98-AH, R2-1707161, Qingdao, China, Jun. 26, 2017, (8p).

Huawei et al., "SDAP Header Format", 3GPP TSG-RAN WG2 Meeting Adhoc#2, R2-1706782, Qingdao, China, Jun. 26, 2017, (5p).

Huawei et al., "Activation and Deactivation of Reflective QoS", 3GPP TSG-RAN WG2 Meeting #98, R2-1704985, Hangzhou, China, May 6, 2017, (3p).

International Search (including English translation) and Written Opinion issued in PCT/CN2017/110944, dated Apr. 20, 2018, (7p).

International Search (including English translation) and Written Opinion issued in PCT/CN2017/094407, dated Nov. 30, 2017, (9p).

3rd Generation Partnership Project; Technical Specification Group Radio Access Network. NR; NR and NG-RAN Overall Description; Stage 2 (Release 15), 3GPPTS 38 300 V0.4.1, Jun. 30, 2017, pp. 16-23, 38-40 and 49-53.

Mediatek Inc. pCR 23.501—Corrections to UE-derived QoS rule. SA WG2 Meeting #121 S2-173145.31 Mar. 31, 2017 (9p).

Qualcomm Incorporated. Further Consideration of SDAP Header. R2-1705058; 3GPP TSG-RAN WG2 Meeting #98, May 19, 2017, sections 2 and 3, (2p).

Indian Examination Report of counterpart Indian Application No. 202027007793 dated Mar. 22, 2021, (5p).

First Office Action of Chinese Application No. 201780001600.1 dated Mar. 29, 2021 with English translation, (48p).

First Office Action of Chinese Application No. 201780000665.4 dated Jul. 28, 2021 with English translation, (22p).

Huawei, et al., "SDAP Header Format", 3GPP TSG-RAN WG2#99 Meeting R2-1708932, Jun. 29, 2017, (5p).

* cited by examiner

DOWNLINK DATA PACKET CONFIGURATION METHOD AND DEVICE

CROSS-REFERENCE TO RELATED APPLICATION

This application is a national phase application of PCT Application No. PCT/CN2017/110944, filed on Nov. 14, 2017, which claims priority to PCT Application No. PCT/CN2017/094407, filed on Jul. 25, 2017, the entire contents of which are incorporated herein by reference.

TECHNICAL FIELD

The present disclosure relates to the field of communication technologies, and in particular, to a downlink data packet configuration method and device.

BACKGROUND

The fourth-generation mobile communication (4th-generation, 4G) technology divides the communication process into a non-access stratum (NAS) and an access stratum (AS). The AS mainly includes the following four sub-layers from top to bottom in sequence: a packet data convergence protocol (PDCP) layer, a radio link control (RLC) layer, a media access control (MAC) layer and a physical (PHY) layer.

With the in-depth study of the fifth-generation mobile communication (5th-generation, 5G) technology, in addition to the above four sub-layers, a new sub-layer, i.e., a service data adaptation protocol (SDAP) layer, is introduced above the PDCP layer in the AS. The SDAP layer is used to implement mapping between data streams and data radio bearers (DRBs), that is, to allocate DRBs for data streams so as to transmit data packets through the mapped DRBs. The SDAP layer also adds a QoS flow ID (QFI) to the data packet, so that a terminal determines a DRB to which the data packet is mapped.

SUMMARY

The disclosure provides a downlink data packet configuration method and device.

According to a first aspect of the present disclosure, there is provided a downlink data packet configuration method applied to a base station, including:

determining a target data radio bearer (DRB) corresponding to a downlink data packet to be sent;

determining, according to a pre-configured correspondence between a DRB and a downlink processing attribute, a target downlink processing attribute corresponding to the target DRB, wherein the downlink processing attribute includes attributes indicating whether a non-access stratum (NAS) reflective quality of service (QoS) function is supported, and whether an access stratum (AS) reflective quality of service (QoS) function is supported;

encapsulating the downlink data packet with adding a service data adaptation protocol (SDAP) header when the target downlink processing attribute is an attribute of supporting the NAS reflective QoS function or the AS reflective QoS function; or, encapsulating the downlink data packet without adding an SDAP header when the target downlink processing attribute is an attribute of neither supporting the NAS reflective QoS function nor the AS reflective QoS function; and sending the encapsulated downlink data packet to a terminal.

In a second aspect of the present disclosure, there is provided a downlink data packet configuration method applied to a terminal, including:

receiving a downlink data packet sent by a base station;

determining, according to a pre-configured correspondence between a DRB and a downlink processing attribute, a target downlink processing attribute corresponding to a target DRB which transmits the downlink data packet, wherein the downlink processing attribute includes attributes indicating whether a non-access stratum (NAS) reflective quality of service (QoS) function is supported, and whether an access stratum (AS) reflective quality of service (QoS) function is supported;

determining that the downlink data packet is encapsulated with an SDAP header when the target downlink processing attribute is an attribute of supporting the NAS reflective QoS function or the AS reflective QoS function; or, determining that the downlink data packet is encapsulated without an SDAP header when the target downlink processing attribute is an attribute of neither supporting the NAS reflective QoS function nor the AS reflective QoS function; and processing the downlink data packet based on whether the downlink data packet is encapsulated with an SDAP header as determined.

According to the third aspect of the present disclosure, there is provided a base station. The base station includes a processor, and a memory having stored therein at least one instruction, at least one program, a code set or an instruction set, which is loaded and executed by the processor to implement the downlink data packet configuration method according to the first aspect of the embodiments of the present disclosure.

According to the fourth aspect of the present disclosure, provided is a terminal. The terminal includes a processor, and a memory having stored therein at least one instruction, at least one program, a code set or an instruction set, which is loaded and executed by the processor to implement the downlink data packet configuration method according to the second aspect of the embodiments of the present disclosure.

It is to be understood that both the foregoing general description and the following detailed description are exemplary and illustrative only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
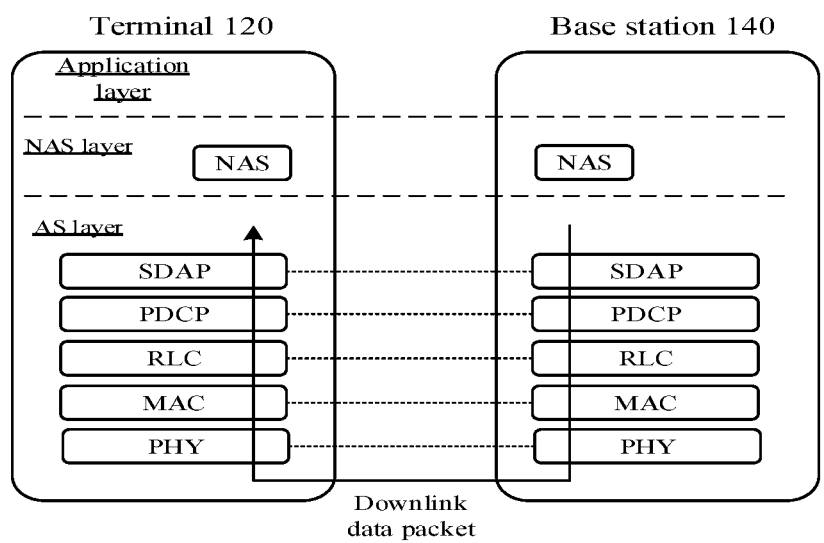
FIG. 1 is a diagram of protocol architecture of a mobile communication system shown according to an exemplary embodiment of the present disclosure.

The terms "first", "second" and similar terms used herein do not denote any order, quantity, or importance, and are merely used to distinguish different components. Likewise, the term "one" or "a/an" and similar terms denote at least one, instead of limitation to quantity. The term "connection" or "connected" and similar terms are not limited to physical or mechanical connection, and may include electrical connection and the connection may be direct or indirect.

The term "module" used herein usually refers to a program or an instruction that is stored in a memory and capable of implementing certain functions. The term "unit" used herein usually refers to a functional structure divided logically and may be implemented by hardware only or a combination of software and hardware.

The expression "a plurality of" used herein refers to two or more. The term "and/or" describes an association relationship between associated objects and indicates that there may be three relationships. For example, A and/or B may indicate the three cases where A exists separately, A and B exist at the same time, and B exists separately. The character "/" generally indicates that an "or" relationship exists between contextual objects.

In order to make the objectives, technical solutions, and advantages of the present disclosure clearer, the embodiments of the present disclosure are described in further detail below with reference to the accompanying drawings.

Some embodiments of the present disclosure provide a downlink data packet configuration method. The method can be implemented by a terminal and a base station cooperatively. The terminal refers to a device that is in data communication with the base station. The terminal may communicates with one or more core networks via a radio access network (RAN), and may be referred to as a subscriber unit, a subscriber station, a mobile station, a mobile, a remote station, an access point, a remote terminal, an access terminal, a user terminal, a user agent or a user device. Optionally, the terminal may also be a relay device, which is not limited to the present embodiments.

A terminal establishes a radio connection with a base station through a radio air interface. Optionally, the radio air interface is a radio air interface based on a 5G standard. For example, the radio air interface is a new radio (NR) air interface. Alternatively, the radio air interface may also be a radio air interface based on the next generation mobile communication network technology post 5G. Optionally, the radio air interface may also be a radio air interface that is compatible with 2G, 3G, 4G and other earlier generation mobile communication network technologies.

In the relevant art, each sub-layer of the AS encapsulates and decapsulates downlink data packets, which occupies plentiful processing resources of a device.

In some embodiments provided in the present disclosure, in view that the base station only adds an SDAP header to the downlink data packet, of which the downlink processing attribute is an attribute of supporting the NAS reflective QoS function or the AS reflective QoS function, but does not add an SDAP header to the downlink data packet, of which the downlink processing attribute is an attribute of neither supporting the NAS reflective QoS function nor the AS reflective QoS function, the increasing problem in the prior art that a large number of processing resources of the device are occupied because each sub-layer of the AS has to encapsulate and decapsulate the downlink data packet regardless of the downlink processing attribute of the downlink data packet is solved and the effect of reducing the occupation of processing resources of the device is achieved.

The base station can be used to perform mutual conversion between a received radio frame and an IP packet and can also be used to coordinate an attribute management of the air interface. For example, the base station may be a base station in the 5G system, i.e, a gNode-B (gNB). Optionally, the gNB may be a base station in a centralized distributed architecture. When being in the centralized distributed architecture, the base station 140 generally includes a central unit (CU) and at least two distributed units (DUs). A protocol stack composed of a service data adaptation protocol (SDAP) layer, a packet data convergence protocol (PDCP) layer, a radio link control (RLC) layer and a media access control (MAC) layer is disposed in the central unit, and the specific implementation mode of the base station 140 is not limited to the present embodiments.

It should be noted that FIG. 1 is a diagram of protocol architecture of a mobile communication system shown according to an exemplary embodiment of the present disclosure. The devices involved in the protocol architecture include a terminal 120 and a base station 140. As shown in FIG. 1, in the 5G technology, the communication underlying architecture includes an application layer, an NAS and an AS from top to bottom in sequence, wherein the AS includes an SDAP layer, a PDCP layer, an RLC layer, a MAC layer and a PHY layer. When the terminal 120 establishes a session with the base station 140, a plurality of data streams can be transmitted during the session. Each data stream may contain a plurality of data packets which are delivered from top to bottom in sequence in the communication underlying architecture of the terminal 120 before they pass through the last layer and are sent to the base station. Prior to being divided into data packets, these data packets exist in the form of data streams in the terminal 120, and the SDAP layer may allocate DRBs, through which these data streams will be transmitted, for these data streams. After the SDAP layer allocates DRBs for these data streams, the data streams will be delivered to the lower layers in the form of data packets. During initial allocation, the DRBs allocated to the same data stream are the same.

During actual transmission, there are a plurality of DRBs. In each of the PDCP layer, the RLC layer and the MAC layer, a sub-module that supports each individual DRB exists. The sub-module may be a virtual software sub-module. When each layer receives a data packet delivered from the previous layer, this data packet is processed in the corresponding sub-module which is allocated at each layer and supports the DRB corresponding to the data packet.

Figure 2:
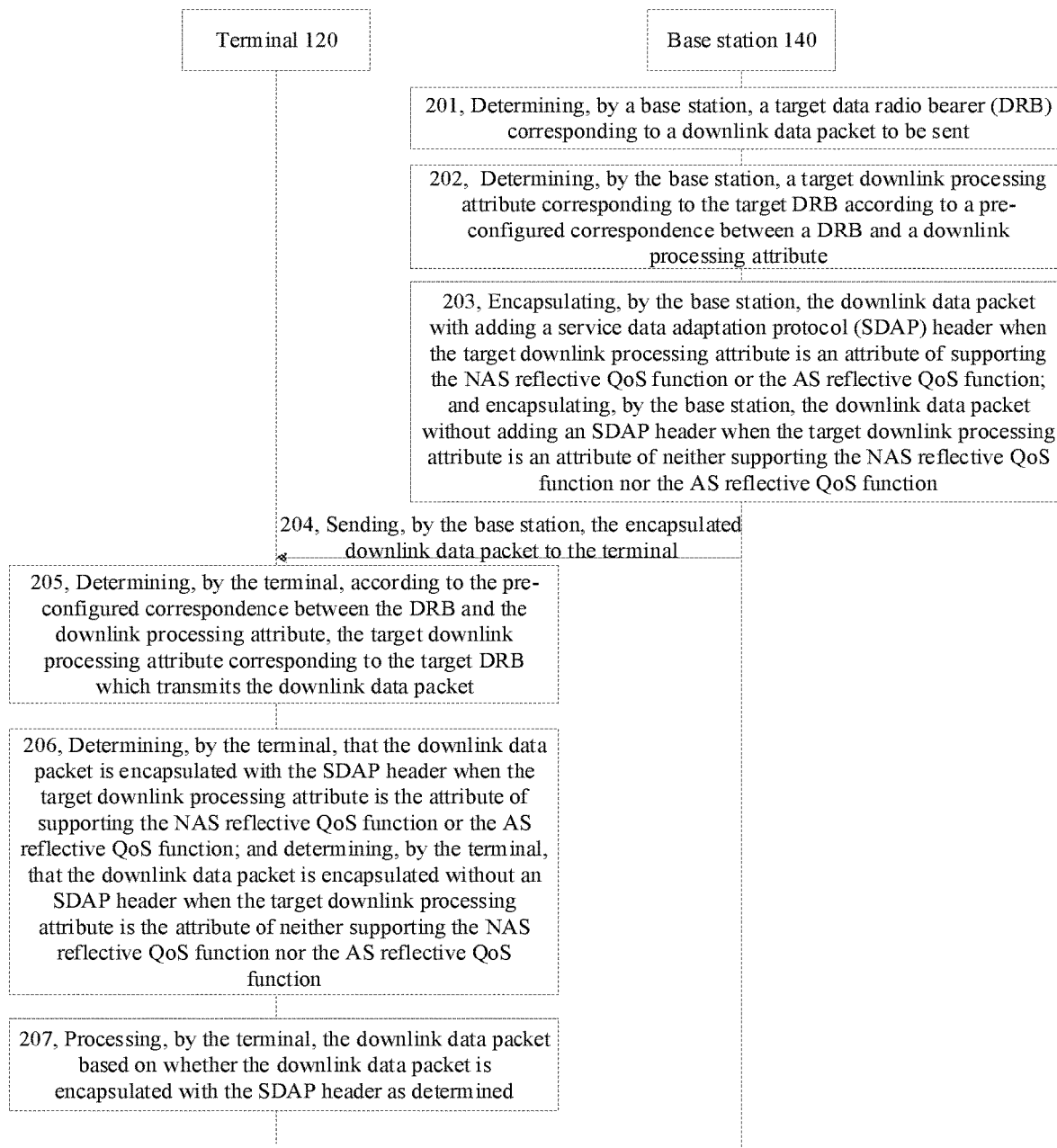
FIG. 2 is a method flowchart of a downlink data packet configuration method shown according to an exemplary embodiment.

FIG. 2 is a method flowchart of a downlink data packet configuration method shown according to an exemplary embodiment. As shown in FIG. 2, this downlink data packet configuration method is applied to the mobile communication system shown in FIG. 1 and includes the following steps.

In step 201, a base station determines a target data radio bearer (DRB) corresponding to a downlink data packet to be sent.

In step 202, the base station determines a target downlink processing attribute corresponding to the target DRB according to a pre-configured correspondence between a DRB and a downlink processing attribute.

The downlink processing attribute includes attributes indicating whether a non-access stratum (NAS) reflective quality of service (QoS) function is supported, and whether an access stratum (AS) reflective quality of service (QoS) function is supported.

In step 203, the base station encapsulates the downlink data packet with adding a service data adaptation protocol (SDAP) header when the target downlink processing attribute is an attribute that indicates supporting the NAS reflective QoS function or the AS reflective QoS function; and the base station encapsulates the downlink data packet by not adding an SDAP header when the target downlink processing attribute is an attribute that indicates no support of both the NAS reflective QoS function and the AS reflective QoS function.

In step 204, the base station sends the encapsulated downlink data packet to the terminal.

Correspondingly, the terminal receives the downlink data packet sent by the base station.

In step 205, the terminal determines, according to the pre-configured correspondence between the DRB and the downlink processing attribute, the target downlink processing attribute corresponding to the target DRB which transmits the downlink data packet.

In step 206, the terminal determines that the downlink data packet is encapsulated with the SDAP header when the target downlink processing attribute is the attribute of supporting the NAS reflective QoS function or the AS reflective QoS function; and the terminal determines that the downlink data packet is encapsulated without an SDAP header when the target downlink processing attribute is the attribute of neither supporting the NAS reflective QoS function nor the AS reflective QoS function.

In step 207, the terminal processes the downlink data packet based on whether the downlink data packet is encapsulated with the SDAP header as determined.

In view of the above, in the downlink data packet configuration method provided in the embodiments of the present disclosure, the base station only adds an SDAP header to the downlink data packet, of which the downlink processing attribute is an attribute of supporting the NAS reflective QoS function or the AS reflective QoS function, but does not add an SDAP header to the downlink data packet, of which the downlink processing attribute is an attribute of neither supporting the NAS reflective QoS function nor the AS reflective QoS function, the increasing problem in the prior art that a large number of processing resources of the device are occupied because each sub-layer of the AS has to encapsulate and decapsulate the downlink data packet regardless of the downlink processing attribute of the downlink data packet is solved and the effect of reducing the occupation of processing resources of the device is achieved.

Figure 3A:
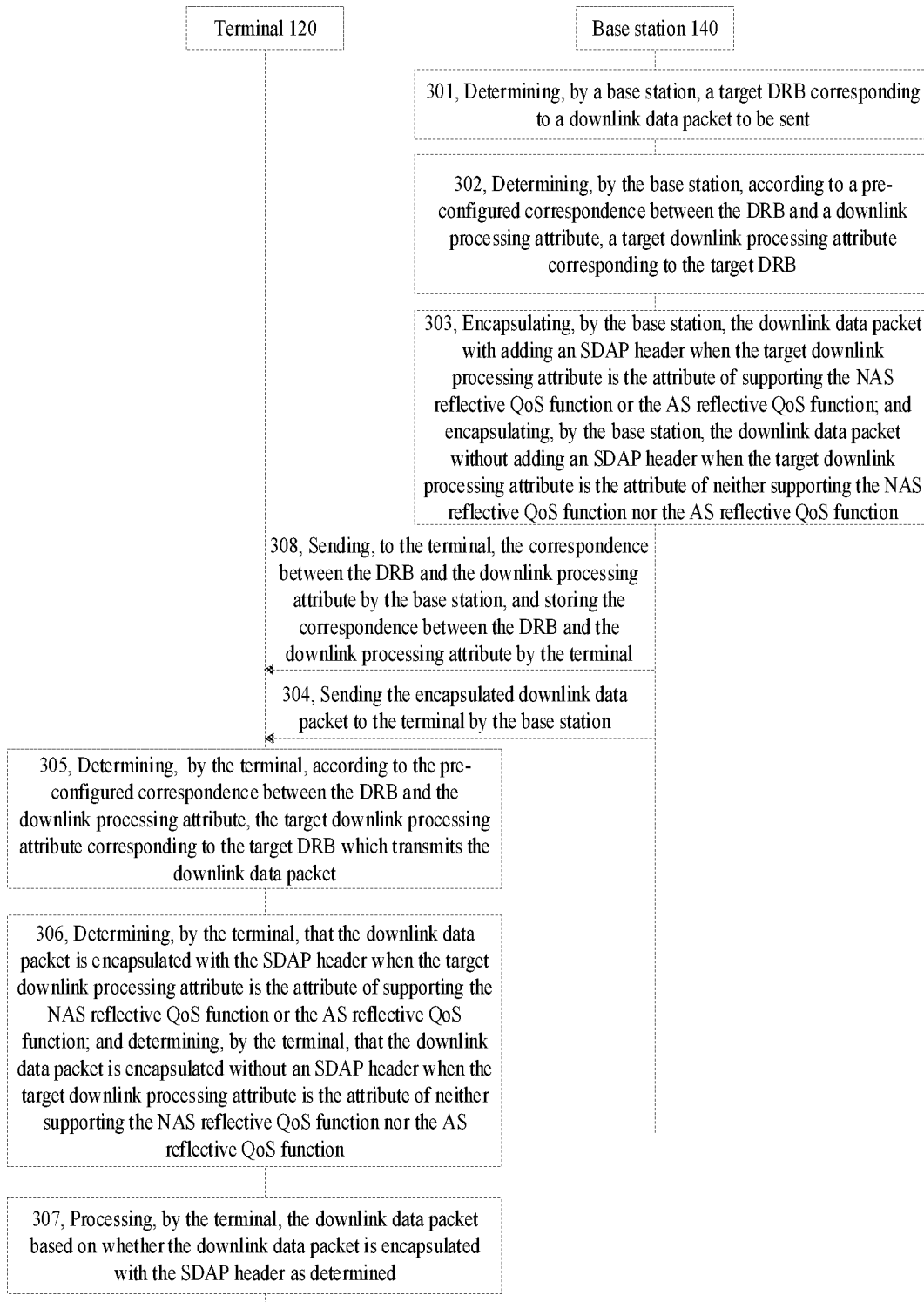
FIG. 3A is a method flowchart of a downlink data packet configuration method shown according to another exemplary embodiment.

FIG. 3A is a method flowchart of a downlink data packet configuration method shown according to another exemplary embodiment. As shown in FIG. 3A, this downlink data packet configuration method is applied to the mobile communication system shown in FIG. 1 and includes the following steps.

In step 301, the base station determines a target DRB corresponding to a downlink data packet to be sent.

A plurality of data streams are transmitted during one session between the terminal and the base station. Each data stream contains a plurality of data packets, wherein the data packet which is sent to the base station by the terminal is called an uplink data packet and the data packet which is sent to the terminal by the base station is called the downlink data packet.

After the terminal establishes a connection with the base station, the base station establishes a plurality of DRBs with the terminal and each DRB corresponds to a different service. Since the attribute of the downlink data packet is known to the base station, after acquiring the downlink data packet, the base station determines, according to a pre-stored correspondence between the service attribute and the DRB, the target DRB corresponding to the service attribute of the downlink data packet.

In step 302, the base station determines, according to a pre-configured correspondence between the DRB and a downlink processing attribute, a target downlink processing attribute corresponding to the target DRB.

One of the correspondences between the DRBs and the downlink processing attributes refers to that a downlink processing attribute corresponds to the data packet in the data stream transmitted by a specific DRB. The downlink processing attribute includes attributes indicating whether a non-access stratum (NAS) reflective quality of service (QoS) function is supported, and whether an access stratum (AS) reflective quality of service (QoS) function is supported.

When the target downlink processing attribute corresponding to the target DRB is an attribute of neither supporting the NAS reflective QoS function nor the AS reflective QoS function, it means that the data packet in the data stream transmitted by the target DRB neither supports the NAS reflective QoS function nor the AS reflective QoS function.

In step 303, the base station encapsulates the downlink data packet with adding an SDAP header when the target downlink processing attribute is the attribute of supporting the NAS reflective QoS function or the AS reflective QoS function; and the base station encapsulates the downlink data packet without adding an SDAP header when the target downlink processing attribute is the attribute of neither supporting the NAS reflective QoS function nor the AS reflective QoS function.

Figure 3B:
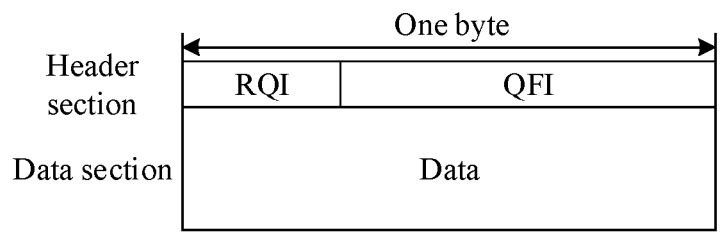
FIG. 3B is a structural diagram of a downlink data packet, of which a target downlink processing attribute is an attribute of supporting the NAS reflective QoS function, shown according to an exemplary embodiment.

FIG. 3B is a structural diagram of a downlink data packet, of which a target downlink processing attribute is an attribute of supporting the NAS reflective QoS function, shown according to an exemplary embodiment. As shown in FIG. 3B, when the target downlink processing attribute is the attribute of supporting the NAS reflective QoS function, an SDAP header is added in the process of encapsulating the downlink data packet and an RQI field and a QoS flow ID (QFI) field are added in the SDAP header. The QFI field is used to identify the data stream to which the downlink data packet belongs.

Figure 3C:
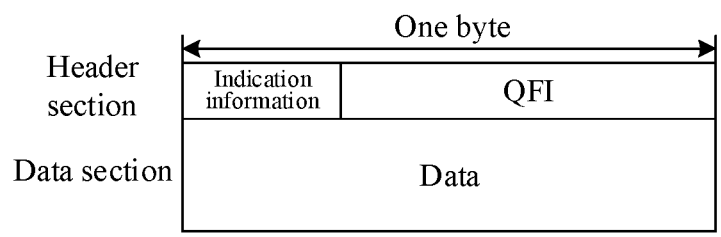
FIG. 3C is a structural diagram of a downlink data packet, of which a target downlink processing attribute is an attribute of only supporting the AS reflective QoS function, shown according to an exemplary embodiment.

FIG. 3C is a structural diagram of a downlink data packet, of which a target downlink processing attribute is an attribute of only supporting the AS reflective QoS function, shown according to an exemplary embodiment. As shown in FIG. 3C, when the target downlink processing attribute is the attribute of only supporting the AS reflective QoS function, an SDAP header is added in the process of encapsulating the downlink data packet and indication information and the QFI field are added in the SDAP header, wherein the indication information is used to indicate whether the SDAP header contains the QFI field.

Optionally, each of the RQI field and the indication information has a length of one bit, and the QFI field has a length of seven bits. In addition to indicating whether the SDAP header includes the QFI field, the indication information is further used to fill the position caused by the inexistence of RQI field in the SDAP header, so that no matter whether the RQI field exists in the SDAP header, the positions of fields other than the RQI field are unchanged in the SDAP head.

Since the SDAP header only occupies one byte, and the QFI field at least contains seven bits, the size of the SDAP header can be effectively controlled and it is effectively guaranteed that the QFI field may carry enough information.

It should be noted that, when the SDAP header does not contain a QFI field, there are reserved bits at the position of the QFI field.

When the target downlink processing attribute is the attribute of neither supporting the NAS reflective QoS function nor the AS reflective QoS function, each sub-layer of the AS at the base station side performs corresponding processing when the downlink data packet is transmitted down to the next layer each time at the base station. Specifically, the corresponding processing on the downlink data packet may be in the following manner(s): data packet encapsulation, data grouping, data encoding, data encryption or the like. The specific processing mode for processing the downlink data packet by the AS of base station is not limited to the present embodiments.

By taking the processing mode of the corresponding processing being data packet encapsulation as an example, the base station encapsulates the data packet in each sub-layer of the AS. Specifically, when the downlink data packet arrive in the SDAP layer, the base station adds an SDAP header to the downlink data packet in the SDAP layer, and sends the downlink data packet after being added with the SDAP header to the next layer, i.e., the PDCP layer; when the downlink data packet arrives in the PDCP layer, the base station adds a PDCP header to the downlink data packet in the PDCP layer, and sends the downlink data packet after being added with the PDCP header to the next layer, i.e., the RLC layer; when the downlink data packet arrives in the RLC layer, the base station adds an RLC header to the downlink data packet in the RLC layer, and sends the downlink data packet after being added with the RLC header to the next layer, i.e., the MAC layer; when the downlink data packet arrives in the MAC layer, the base station adds a MAC header to the downlink data packet in the MAC layer, and sends the downlink data packet arrives added with the MAC header to the next layer, i.e., the PHY layer; and when the downlink data packet arrives in the PHY layer, the base station converts the downlink data packet to bit streams in the PHY layer and sends the bit streams to the terminal.

When the target downlink processing attribute is the attribute of neither supporting the NAS reflective QoS function nor the AS reflective QoS function, when the downlink data packet arrives in the SDAP layer, the base station does not add an SDAP header in the process of encapsulating the downlink data packet in the SDAP layer, and sends the downlink data packet to the next layer, i.e., the PDCP layer; when the downlink data packet arrives in the PDCP layer, the base station adds the PDCP header to the downlink data packet in the PDCP layer, and sends the downlink data packet after being added with the PDCP header to the next layer, i.e., the RLC layer; when the downlink data packet arrives in the RLC layer, the base station adds the RLC header to the downlink data packet in the RLC layer, and sends the downlink data packet after being added with the RLC header to the next layer, i.e., the MAC layer; when the downlink data packet arrives in the MAC layer, the base station adds the MAC header to the downlink data packet in the MAC layer, and sends the downlink data packet after being added with the MAC header to the next layer, i.e., the PHY layer; and when the downlink data packet arrives in the PHY layer, the base station converts the downlink data packet to bit streams in the PHY layer and sends the bit streams to the terminal.

In step 304, the base station sends the encapsulated downlink data packet to the terminal.

Correspondingly, the terminal receives the downlink data packet sent by the base station.

In step 305, the terminal determines, according to the pre-configured correspondence between the DRB and the downlink processing attribute, the target downlink processing attribute corresponding to the target DRB which transmits the downlink data packet.

The terminal determines that the downlink data packet neither supports the NAS reflective QoS function nor the AS reflective QoS function when the target downlink processing attribute corresponding to the target DRB which transmits the downlink data packet is the attribute of neither supporting the NAS reflective QoS function nor the AS reflective QoS function.

The terminal determines that the downlink data packet supports the NAS reflective QoS function when the target downlink processing attribute corresponding to the target DRB which transmits the downlink data packet is the attribute of supporting the NAS reflective QoS function.

In step 306, the terminal determines that the downlink data packet is encapsulated with the SDAP header when the target downlink processing attribute is the attribute of supporting the NAS reflective QoS function or the AS reflective QoS function; and the terminal determines that the downlink data packet is encapsulated without an SDAP header when the target downlink processing attribute is the attribute of neither supporting the NAS reflective QoS function nor the AS reflective QoS function.

In step 307, the downlink data packet is processed based on whether the downlink data packet is encapsulated with the SDAP header as determined.

Figure 3D:
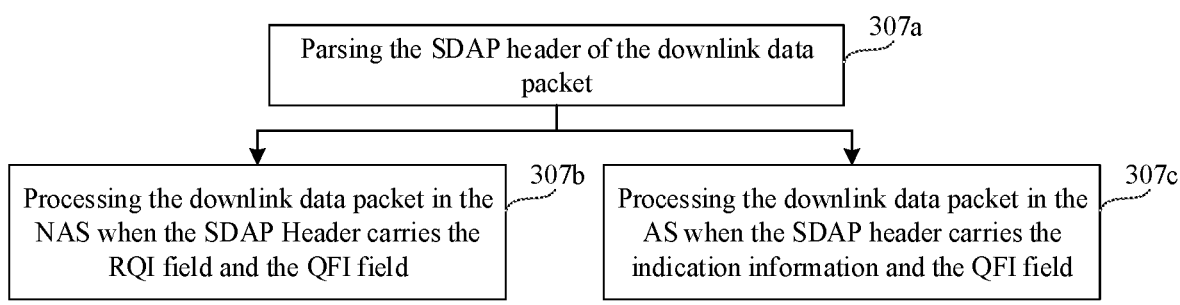
FIG. 3D is a method flowchart of a method of processing a downlink data packet by a terminal shown according to an exemplary embodiment.

FIG. 3D is a method flowchart of a method of processing a downlink data packet by a terminal shown according to an exemplary embodiment. As shown in FIG. 3D, in a possible mode, when it is determined that the downlink data packet is encapsulated with the SDAP header, the method of processing the downlink data packet by the terminal includes the following steps.

In step 307a, the SDAP header of the downlink data packet is parsed.

When the target downlink processing attribute is the attribute of supporting the NAS reflective QoS function or the AS reflective QoS function, each sub-layer of the AS at the terminal side performs corresponding processing when the downlink data packet is transmitted up to an upper layer each time at the terminal side. Specifically, the corresponding processing for the downlink data packet may be in the following manner(s): data packet decapsulation, data ungrouping, data decoding, data decryption and the like. The specific processing mode for processing the downlink data packet by the terminal in the AS is not limited to the present embodiments.

By taking the processing mode of the corresponding processing being data packet decapsulation as an example, the terminal decapsulates the data packet in each sub-layer of the AS. Specifically, when receiving the bit streams corresponding to the downlink data packet in the PHY layer, the terminal converts the bit streams to the downlink data packet and then sends the downlink data packet to an upper layer, i.e., the MAC layer; when receiving the downlink data packet in the MAC layer, the terminal decapsulates the MAC header of the downlink data packet and sends the downlink data packet, of which the MAC header is decapsulated, to an upper layer, i.e., the RLC layer; when the downlink data packet arrives in the RLC layer, the terminal decapsulates the RLC header of the downlink data packet in the RLC layer and sends the downlink data packet, of which the RLC header is decapsulated, to an upper layer, i.e., the PDCP layer; when the downlink data packet arrives in the PDCP layer, the terminal decapsulates the PDCP header of the downlink data packet in the PDCP layer and sends the downlink data packet, of which the PDCP header is decapsulated, to the an upper layer, i.e., the SDAP layer; and when the downlink data packet arrives in the SDAP layer, the terminal decapsulates the SDAP header of the downlink data packet in the SDAP layer.

In step 307b, the downlink data packet is processed in the NAS when the SDAP header carries the RQI field and the QFI field.

When the SDAP header carries the RQI field and the QFI field, it indicates that the downlink data packet supports the NAS Reflective QoS function, and the terminal can extract the RQI field and the QFI field from the SDAP header, and deliver the RQI field and the QFI field to the NAS. The NAS processes the downlink data packet according to the RQI field and the QFI field, and sends the processed downlink data packet to an application layer.

In step 307c, when the SDAP header carries the indication information and the QFI field, the downlink data packet is processed in the AS.

When the SDAP header carries the indication information and the QFI field, it indicates that the downlink data packet supports the AS Reflective QoS function. As such, the terminal parses the SDAP header of the downlink data packet to acquire the indication information. When the indication information indicates that the SDAP header contains the QFI field, the terminal firstly acquires the QFI field in the SDAP header, then processes the downlink data packet in the AS according to the QFI field, and sends the processed downlink data packet to the application layer.

It should be noted that when it is determined that the downlink data packet is encapsulated without an SDAP header, the terminal transparently transmits the downlink data packet to the next layer.

In view of the above, in the downlink data packet configuration method provided in the embodiments of the present disclosure, the base station only adds an SDAP header to the downlink data packet, of which the downlink processing attribute is an attribute of supporting the NAS reflective QoS function or the AS reflective QoS function, but does not add an SDAP header to the downlink data packet, of which the downlink processing attribute is an attribute of neither supporting the NAS reflective QoS function nor the AS reflective QoS function, the increasing problem in the prior art that a large number of processing resources of the device are occupied because each sub-layer of the AS has to encapsulate and decapsulate the downlink data packet regardless of the downlink processing attribute of the downlink data packet is solved and the effect of reducing the occupation of processing resources of the device is achieved.

In a possible implementation mode, for the terminal, the pre-configured correspondence between the DRB and the downlink processing attribute may be configured manually, or pre-set by the system. In addition, the terminal may also obtain, after the terminal and the base station establish the plurality of DRBs and before the base station sends the downlink data packet to the terminal, the pre-configured correspondence by receiving the correspondence between the DRBs and the downlink processing attributes, which is sent by the base station to the terminal.

In step 308, the base station sends, to the terminal, the correspondence between the DRB and the downlink processing attribute, and the correspondence between the DRB and the downlink processing attribute is stored by the terminal.

Optionally, the base station sends, to the terminal, the correspondence between the DRB and the downlink processing attribute through an RRC configuration message.

Correspondingly, the terminal receives the correspondence between the DRB and the downlink processing attribute, which is sent by the base station, and stores the correspondence between the DRB and the downlink processing attribute.

Optionally, the terminal receives the correspondence between the DRB and the downlink processing attribute, which is sent by the base station through the RRC configuration message.

It should be noted that step 308 may be implemented before or after any of step 301 and step 303. The location of step 308 in the flowchart shown in FIG. 3A is merely for the purpose of illustration and the implementation sequence of step 308 and step 301 as well as step 303 is not limited to the present embodiment.

Figure 4A:
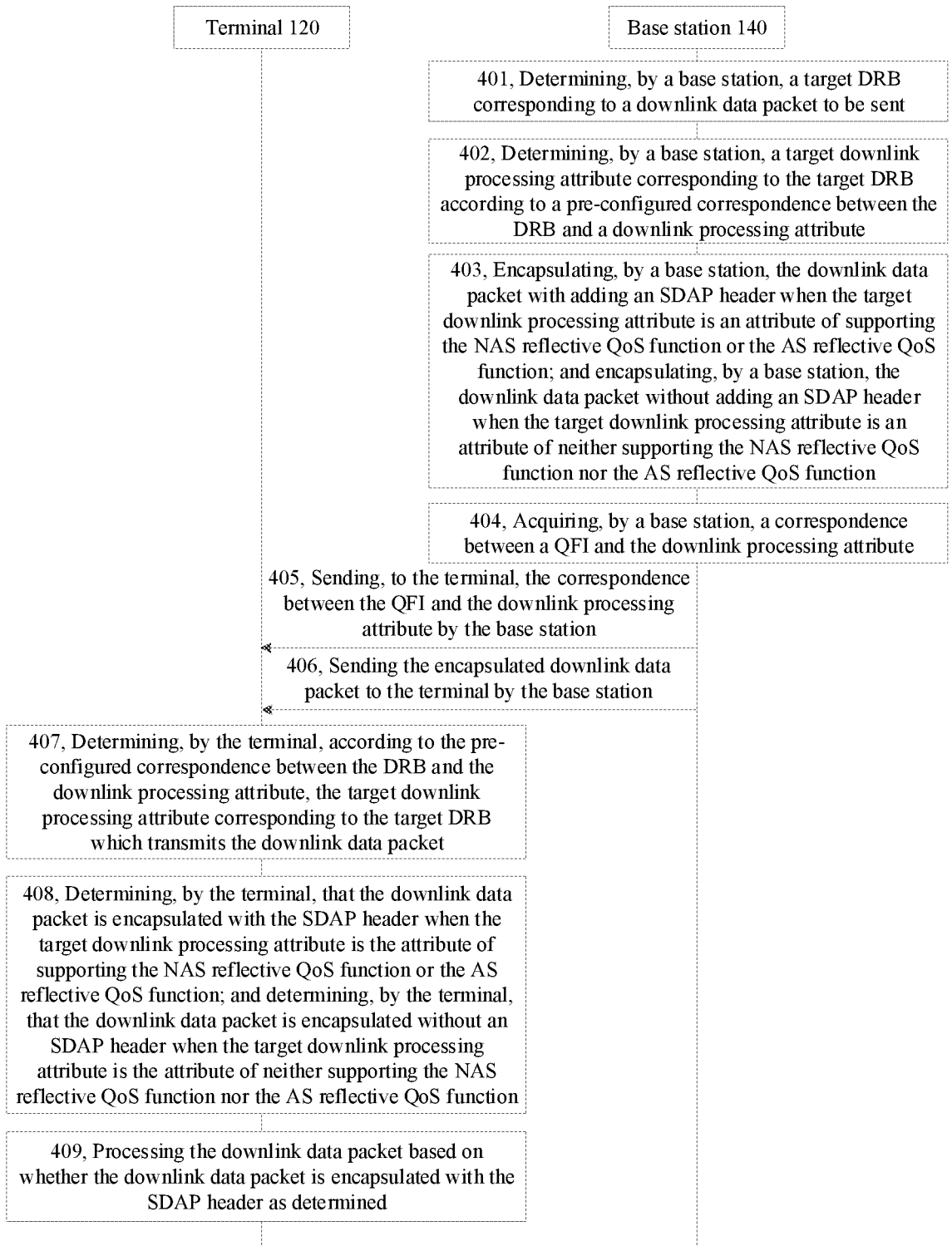
FIG. 4A is a method flowchart of a downlink data packet configuration method shown according to still another exemplary embodiment.

FIG. 4A is a method flowchart of a downlink data packet configuration method shown according to still another exemplary embodiment. As shown in FIG. 4A, this downlink data packet configuration method is applied to the mobile communication system shown in FIG. 1 and includes the following steps.

In step 401, the base station determines a target DRB corresponding to a downlink data packet to be sent.

In step 402, the base station determines a target downlink processing attribute corresponding to the target DRB according to a pre-configured correspondence between the DRB and a downlink processing attribute.

In step 403, the base station encapsulates the downlink data packet with adding an SDAP header when the target downlink processing attribute is an attribute of supporting the NAS reflective QoS function or the AS reflective QoS function; and the base station encapsulates the downlink data packet without adding an SDAP header when the target downlink processing attribute is an attribute of neither supporting the NAS reflective QoS function nor the AS reflective QoS function.

In step 404, the base station acquires a correspondence between a QFI and the downlink processing attribute.

The QFI is a unique identifier of a QoS flow, and each terminal corresponds to a plurality of QoS flows.

The correspondence between the QFI and the downlink processing attribute at least includes: the downlink processing attribute corresponding to the QFI is an attribute of supporting the NAS reflective QoS function, the downlink processing attribute corresponding to the QFI is an attribute of supporting the AS reflective QoS function, and the downlink processing attribute corresponding to the QFI is an attribute of neither supporting the NAS reflective QoS function nor the AS reflective QoS function.

Whether the downlink processing attribute corresponding to the QFI or not is configured by a core network as an attribute of supporting the NAS reflective QoS function. After acquiring, from the core network, a QFI having a corresponding downlink processing attribute of supporting the NAS reflective QoS function, the base station adds the QFI and the attribute of supporting the NAS reflective QoS function, as a group of correspondence, to the correspondences between the QFIs and the downlink processing attributes. After configuring a QFI having a downlink processing attribute of supporting the AS reflective QoS function, the base station adds the QFI and the attribute of supporting the AS reflective QoS function, as a group of correspondence, to the correspondences between the QFIs and the downlink processing attributes, and adds the QFI having a corresponding downlink processing attribute of not supporting the NAS reflective QoS function or AS reflective QoS function, and the attribute of neither supporting the NAS reflective QoS function nor AS reflective QoS function, as a group of correspondence, to the correspondences between the QFIs and the downlink processing attributes.

Optionally, the base station configures a correspondence between the QFI and the DRB according to the correspondence between the QFI and the downlink processing attribute and the correspondence between the DRB and the downlink processing attribute.

It should be noted that one DRB corresponds to a plurality of QFIs. When the downlink processing attribute corresponding to a DRB includes the attribute of supporting the NAS Reflective QoS function, it indicates that the plurality of QFIs corresponding to the DRB includes at least one QFI that supports the NAS Reflective QoS function. When the downlink processing attribute corresponding to the DRB includes the attribute of supporting the AS Reflective QoS function, it indicates that the plurality of QFIs corresponding to the DRB includes at least one QFI that supports the AS Reflective QoS function.

In step 405, the base station sends, to the terminal, the correspondence between the QFI and the downlink processing attribute.

Correspondingly, the terminal receives and stores the correspondence between the QFI and the downlink processing attribute, which is sent by the base station.

Optionally, the base station sends, to the terminal, the correspondence between the QFI and the downlink processing attribute through an RRC configuration message. Correspondingly, the terminal receives the correspondence between the QFI and the downlink processing attribute, which is sent by the base station through the RRC configuration message.

In step 406, the base station sends the encapsulated downlink data packet to the terminal.

Correspondingly, the terminal receives the downlink data packet sent by the base station.

In step 407, the terminal determines, according to the pre-configured correspondence between the DRB and the downlink processing attribute, the target downlink processing attribute corresponding to the target DRB which transmits the downlink data packet.

In step 408, the terminal determines that the downlink data packet is encapsulated with the SDAP header when the target downlink processing attribute is the attribute of supporting the NAS reflective QoS function or the AS reflective QoS function; and the terminal determines that the downlink data packet is encapsulated without an SDAP header when the target downlink processing attribute is the attribute of neither supporting the NAS reflective QoS function nor the AS reflective QoS function.

In step 409, the downlink data packet is processed based on whether the downlink data packet is encapsulated with the SDAP header as determined.

Figure 4B:
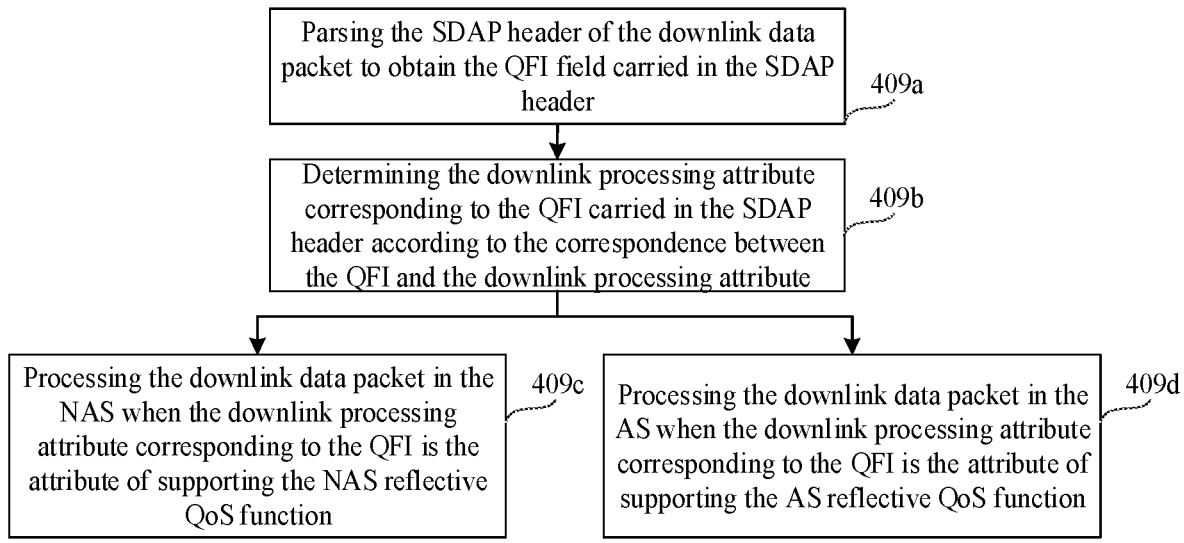
FIG. 4B is a method flowchart of a method of processing a downlink data packet by a terminal shown according to an exemplary embodiment.

FIG. 4B is a method flowchart of a method of processing a downlink data packet by a terminal shown according to an exemplary embodiment. As shown in FIG. 4B, in a possible mode, when it is determined that the downlink data packet is encapsulated with the SDAP header, the method of processing the downlink data packet by the terminal includes the following steps.

In step 409a, the SDAP header of the downlink data packet is parsed to obtain the QFI field carried in the SDAP header.

The QFI field carried in the SDAP header of the downlink data packet is the QFI corresponding to the QoS Flow which transmits the downlink data packet.

In step 409b, the downlink processing attribute corresponding to the QFI carried in the SDAP header is determined according to the correspondence between the QFI and the downlink processing attribute.

Because one DRB corresponds to a plurality of QFIs, when the downlink processing attribute corresponding to the DRB includes the attribute of supporting the NAS reflective QoS function or the AS reflective QoS function, the terminal can only determine that the downlink data packet is encapsulated with the SDAP header, but cannot determine that the downlink processing attribute corresponding to the downlink data packet is either the attribute of supporting the NAS Reflective QoS function or the attribute of supporting the AS Reflective QoS function. After parsing the SDAP header of the downlink data packet to obtain the QFI field carried in the SDAP header, the terminal can determine, according to the correspondence between the QFI and the downlink processing attribute, the downlink processing attribute of the downlink data packet corresponding to the QFI carried in the SDAP header.

In step 409c, when the downlink processing attribute corresponding to the QFI is the attribute of supporting the NAS reflective QoS function, the downlink data packet is processed in the NAS.

When the downlink processing attribute corresponding to the QFI carried in the SDAP header of the downlink data packet is the attribute of supporting NAS Reflective QoS function, it indicates that the downlink data packet supports the NAS Reflective QoS function, and the terminal can extract the RQI field and the QFI field from the SDAP header, and deliver the RQI field and the QFI field to the NAS. The NAS processes the downlink data packet according to the RQI field and the QFI field, and sends the processed downlink data packet to an application layer.

In step 409d, when the downlink processing attribute corresponding to the QFI is the attribute of supporting the AS reflective QoS function, the downlink data packet is processed in the AS.

When the downlink processing attribute corresponding to the QFI carried in the SDAP header of the downlink data packet is the attribute of supporting AS Reflective QoS function, it indicates that the downlink data packet supports the AS Reflective QoS function, and the terminal parses the SDAP header of the downlink data packet to acquire the indication information. When the indication information indicates that the SDAP header contains the QFI field, the terminal firstly acquires the QFI field in the SDAP header, then processes the downlink data packet in the AS according to the QFI field, and sends the processed downlink data packet to the application layer.

It should be noted that since in the present embodiments, step 401 to step 403 correspond to step 301 to step 303 respectively and step 406 to step 408 are similar to step 304 to step 306 respectively, step 401 to step 403 and step 406 to step 408 are not repeated in the present embodiments.

In view of the above, in the downlink data packet configuration method provided in the embodiment of the present disclosure, the base station only adds an SDAP header to the downlink data packet, of which the downlink processing attribute is an attribute of supporting the NAS reflective QoS function or the AS reflective QoS function, but does not add an SDAP header to the downlink data packet, of which the downlink processing attribute is an attribute of neither supporting the NAS reflective QoS function nor the AS reflective QoS function, the increasing problem in the prior art that a large number of processing resources of the device are occupied because each sub-layer of the AS has to encapsulate and decapsulate the downlink data packet regardless of the downlink processing attribute of the downlink data packet is solved and the effect of reducing the occupation of processing resources of the device is achieved.

In a possible implementation mode, when the terminal switches to a target base station, an original base station sends to the target base station configuration information related to the terminal in the original base station, thereby improving the efficiency of configuring, by the target base station, the configuration information related to the terminal in the target base station.

Figure 5:
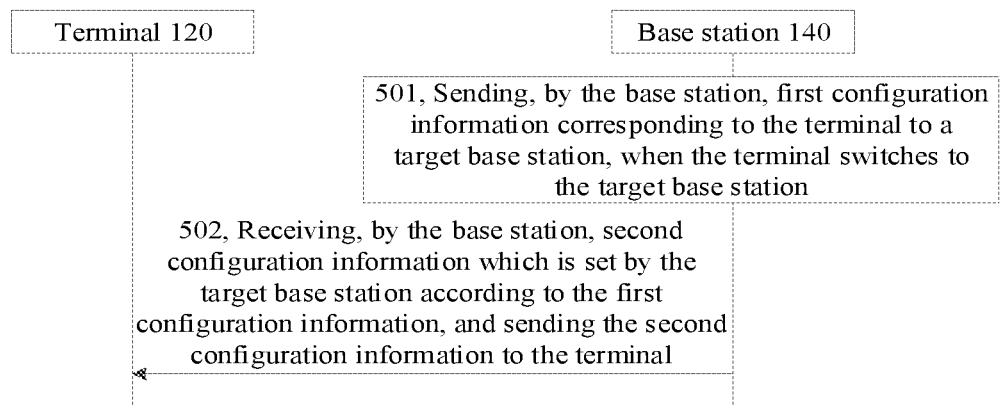
FIG. 5 is a method flowchart of a correspondence configuration method shown according to an exemplary embodiment.

FIG. 5 is a method flowchart of a correspondence configuration method shown according to an exemplary embodiment. As shown in FIG. 5, the correspondence configuration method is applied to the mobile communication system shown in FIG. 1 and includes the following steps.

In step 501, when the terminal switches to the target base station, the base station sends, to the target base station, first configuration information corresponding to the terminal.

The first configuration information includes the correspondence between the QFI and the downlink processing attribute, and/or the correspondence between the DRB and the downlink processing attribute.

It should be noted that in the process of performing network switching, the terminal switches from this base station to the target base station. In the scenario that the terminal is connected with two or more base stations at the same time, when the target base station has downlink data sent to the terminal, the terminal may switch to the target base station from this base station.

In step 502, the base station receives second configuration information which is set by the target base station according to the first configuration information, and sends the second configuration information to the terminal.

Optionally, the target server continues to use the first configuration information during the process of setting the second configuration information or modifies the first configuration information according to service loads, QoS guarantee and other information to obtain the second configuration information.

For example, because the QFI having a corresponding downlink processing attribute of supporting the NAS reflective QoS function is configured by the core network, after receiving the first configuration information carrying the correspondence between the QFI and the downlink processing attribute, the target base station may directly continue to use the configuration information related to the QFI which has a corresponding downlink attribute of supporting the NAS reflective QoS function, and adds the configuration information related to the QFI which has a corresponding downlink attribute of supporting the NAS reflective QoS function to the second configuration information.

In addition, for example, because one DRB corresponds to a plurality of QFIs, and when the service load of a specified DRB is excessive, it may not be able to guarantee that a good QoS guarantee is provided for the service. After receiving the first configuration information, the target base station can change the number of the QFIs corresponding to each DRB according to the actual load of each DRB (for example, decrease the number of the QFIs corresponding to the DRB having an excessive service load and increase the number of the QFIs corresponding to the DRB having a smaller service load), or change the correspondence between the DRB and the processing attribute (for example, when there is a large amount of downlink data needed to be processed by the NAS, change the processing attribute corresponding to parts of DRBs to the attribute of supporting both the NAS Reflective QoS function and the AS Reflective QoS function from the attribute of supporting the AS Reflective QoS function, or change the processing attribute corresponding to parts of DRBs to the attribute of supporting the NAS Reflective QoS function from the attribute of supporting the AS Reflective QoS function), thereby obtaining the second configuration information.

Correspondingly, the terminal receives and stores the second configuration information sent by the base station.

The second configuration information includes a correspondence between the QFI and the downlink processing attribute, which corresponds to the target base station, and/or a correspondence between the DRB and the downlink processing attribute, which corresponds to the target base station.

In view of the above, in the downlink data packet configuration method provided in the embodiment of the present disclosure, the base station only adds an SDAP header to the downlink data packet, of which the downlink processing attribute is an attribute of supporting the NAS reflective QoS function or the AS reflective QoS function, but does not add an SDAP header to the downlink data packet, of which the downlink processing attribute is an attribute of neither supporting the NAS reflective QoS function nor the AS reflective QoS function, the increasing problem in the prior art that a large number of processing resources of the device are occupied because each sub-layer of the AS has to encapsulate and decapsulate the downlink data packet regardless of the downlink processing attribute of the downlink data packet is solved and the effect of reducing the occupation of processing resources of the device is achieved.

In the present embodiment, when the terminal switches to the target base station, an original base station sends, to the target base station, configuration information related to the terminal in the original base station, thereby improving the efficiency of configuring, by the target base station, the configuration information related to the terminal in the target base station.

It should be noted that the state name and the message name mentioned in the above embodiments are illustrative, and are not limited in the present embodiments. A state name and a message name are considered to be within the protection scope of the present disclosure as long as the state name or the message name has the same state feature or the same message function.

The following is device embodiments of the present disclosure, which may be used to implement the method embodiments of the present disclosure. For the details not disclosed in the device embodiments of the present disclosure, reference can be made to the method embodiments of the present disclosure.

Figure 6:
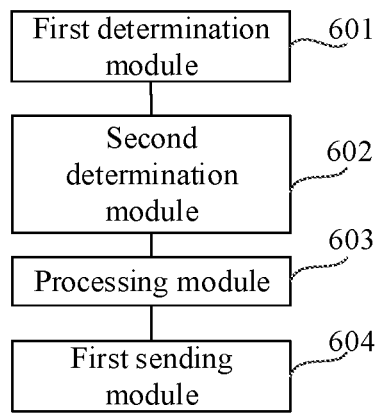
FIG. 6 is a block diagram of a downlink data packet configuration device shown according to an exemplary embodiment.

FIG. 6 is a block diagram of a downlink data packet configuration device shown according to an exemplary embodiment. As shown in FIG. 6, the downlink data packet configuration device is applied to the base station in the mobile communication system shown in FIG. 1. The downlink data packet configuration device includes, but is not limited to: a first determination module 601, a second determination module 602, a processing module 603 and a first sending module 604.

The first determination module 601 is configured to determine a target data radio bearer (DRB) corresponding to a downlink data packet to be sent.

The second determination module 602 is configured to determine, according to a configured and stored correspondence between a DRB and a downlink processing attribute, a target downlink processing attribute corresponding to the target DRB, wherein the downlink processing attribute includes attributes indicating whether an NAS reflective QoS function is supported, and whether an AS reflective QoS function is supported.

The processing module 603 is configured to encapsulate the downlink data packet with adding a service data adaptation protocol (SDAP) header when the target downlink processing attribute is the attribute of supporting the NAS reflective QoS function or the AS reflective QoS function; and encapsulate the downlink data packet without adding an SDAP header when the target downlink processing attribute is the attribute of neither supporting the NAS reflective QoS function nor the AS reflective QoS function.

The first sending module 604 is configured to send the encapsulated downlink data packet to a terminal.

Optionally, the processing module 603 includes a first addition unit 603a and a second addition unit 603b.

The first addition unit 603a is configured to encapsulate the downlink data packet with adding an SDAP header and add an RQI field and a QoS flow ID (QFI) field in the SDAP header when the target downlink processing attribute is the attribute of supporting the NAS reflective QoS function.

The second addition unit 603b is configured to encapsulate the downlink data packet with adding an SDAP header and add indication information and the QFI field in the SDAP header when the target downlink processing attribute is the attribute of only supporting the AS reflective QoS function, wherein the indication information is used to indicate whether the SDAP header contains the QFI field.

Optionally, the RQI field has a length of one bit, and the QFI field has a length of seven bits.

Optionally, the device further includes a second sending module.

The second sending module is configured to send, to the terminal, the correspondence between the DRB and the downlink processing attribute before sending the downlink data packet to the terminal, and the correspondence between the DRB and the downlink processing attribute is stored by the terminal.

Optionally, the second sending module is further configured to:

send, to the terminal, the correspondence between the DRB and the downlink processing attribute through an RRC configuration message.

Optionally, the device further includes:

an acquisition module configured to acquire a correspondence between a QFI and the downlink processing attribute before the encapsulated downlink data packet is sent to the terminal; and a third sending module configured to send, to the terminal, the correspondence between the QFI and the downlink processing attribute, and the correspondence between the QFI and the downlink processing attribute is stored by the terminal.

Optionally, the device further includes:

a fourth sending module configured to send, to a target base station, first configuration information corresponding to the terminal when the terminal switches to the target base station, wherein the first configuration information includes the correspondence between the QFI and the downlink processing attribute, and/or the correspondence between the DRB and the downlink processing attribute; and a fifth sending module configured to receive second configuration information which is set by the target base station according to the first configuration information and send the second configuration information to the terminal, and the second configuration information is stored by the terminal and includes a correspondence between the QFI and the downlink processing attribute, which corresponds to the target base station, and a correspondence between the DRB and the downlink processing attribute, which corresponds to the target base station.

In view of the above, in the downlink data packet configuration device provided in the embodiment of the present disclosure, the base station only adds an SDAP header to the downlink data packet, of which the downlink processing attribute is an attribute of supporting the NAS reflective QoS function or the AS reflective QoS function, but does not add an SDAP header to the downlink data packet, of which the downlink processing attribute is an attribute of neither supporting the NAS reflective QoS function nor the AS reflective QoS function, the increasing problem in the prior art that a large number of processing resources of the device are occupied because each sub-layer of the AS has to encapsulate and decapsulate the downlink data packet regardless of the downlink processing attribute of the downlink data packet is solved and the effect of reducing the occupation of processing resources of the device is achieved.

Figure 7:
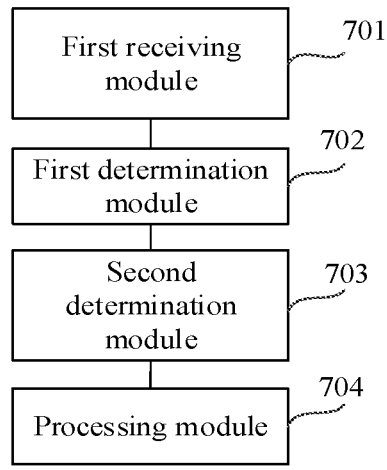
FIG. 7 is a block diagram of a downlink data packet configuration device shown according to an exemplary embodiment.

FIG. 7 is a block diagram of a downlink data packet configuration device shown according to an exemplary embodiment. As shown in FIG. 7, the downlink data packet configuration device is applied to the terminal in the mobile communication system shown in FIG. 1. The downlink data packet configuration device includes, but is not limited to: a first receiving module 701, a second determination module 702, a processing module 703 and a transparent transmission module 704.

The first receiving module 701 is configured to receive a downlink data packet sent by a base station.

The first determination module 702 is configured to determine, according to a pre-configured correspondence between a DRB and a downlink processing attribute, a target downlink processing attribute corresponding to a target DRB which transmits the downlink data packet, wherein the downlink processing attribute includes attributes indicating whether a non-access stratum (NAS) reflective quality of service (QoS) function is supported, and whether an access stratum (AS) reflective quality of service (QoS) function is supported.

The second determination module 703 is configured to determine that the downlink data packet is encapsulated with an SDAP header when the target downlink processing attribute is the attribute of supporting the NAS reflective QoS function or the AS reflective QoS function; and determine that the downlink data packet is encapsulated without an SDAP header when the target downlink processing attribute is the attribute of neither supporting the NAS reflective QoS function nor the AS reflective QoS function.

The processing module 704 is configured to process the downlink data packet based on whether the downlink data packet is encapsulated with the SDAP header as determined.

Optionally, when it is determined that the downlink data packet is encapsulated with the SDAP header, the processing module 704 includes a first parsing unit, a first processing unit and a second processing unit.

The first parsing unit is configured to parse the SDAP header of the downlink data packet.

The first processing unit is configured to process the downlink data packet in an NAS when the SDAP header carries an RQI field and a QFI field.

The second processing unit is configured to process the downlink data packet in an AS when the SDAP header carries indication information and the QFI field.

Optionally, the RQI field has a length of one bit, and the QFI field has a length of seven bits.

Optionally, the device further includes: a storage module.

The storage module is configured to receive, before the downlink data packet sent by the base station is received, the correspondence between the DRB and the downlink processing attribute, which is sent by the base station, and store the correspondence between the DRB and the downlink processing attribute.

Optionally, the storage module is further configured to:

receive the correspondence between the DRB and the downlink processing attribute, which is sent by the base station through an RRC configuration message.

Optionally, the device further includes:

a second receiving module configured to receive and store, before the downlink data packet sent by the base station is received, a correspondence between a QFI and the downlink processing attribute, which is sent by the base station.

When it is determined that the downlink data packet is encapsulated with the SDAP header, the processing module further includes:

a second parsing unit configured to parse the SDAP header of the downlink data packet to obtain the QFI field carried in the SDAP header; and a determination unit configured to determine, according to the correspondence between the QFI and the downlink processing attribute, a downlink processing attribute corresponding to the QFI field carried in the SDAP header;

a third processing unit configured to process the downlink data packet in the NAS when the downlink processing attribute corresponding to the QFI is the attribute of supporting the NAS reflective QoS function; and a fourth processing unit configured to process the downlink data packet in the AS when the downlink processing attribute corresponding to the QFI is the attribute of supporting the AS reflective QoS function.

Optionally, the device further includes:

a third receiving module configured to receive and store second configuration information sent by the base station, wherein the second configuration information is information obtained from the target base station after the base station sends, to a target base station, first configuration information corresponding to the terminal when a predetermined condition is met, The first configuration information includes the correspondence between the QFI and the downlink processing attribute, and/or the correspondence between the DRB and the downlink processing attribute, and the second configuration information at least includes a correspondence between the QFI and the downlink processing attribute, which corresponds to the target base station, and the correspondence between the DRB and the downlink processing attribute, which corresponds to the target base station.

In view of the above, in the downlink data packet configuration device provided in the embodiment of the present disclosure, the base station only adds an SDAP header to the downlink data packet, of which the downlink processing attribute is an attribute of supporting the NAS reflective QoS function or the AS reflective QoS function, but does not add an SDAP header to the downlink data packet, of which the downlink processing attribute is an attribute of neither supporting the NAS reflective QoS function nor the AS reflective QoS function, the increasing problem in the prior art that a large number of processing resources of the device are occupied because each sub-layer of the AS has to encapsulate and decapsulate the downlink data packet regardless of the downlink processing attribute of the downlink data packet is solved and the effect of reducing the occupation of processing resources of the device is achieved.

The specific modes of respective module for executing operations the device in the above embodiments have been described in details in the embodiments of the related method and are not further described in detail herein.

An exemplary embodiment of the present disclosure provides a base station capable of implementing a downlink data packet configuration method provided in the present disclosure. The base station includes a processor, and a memory for storing a processor-executable instruction.

The processor is configured to:

determine a target data radio bearer (DRB) corresponding to a downlink data packet to be sent;

determine, according to a pre-configured correspondence between a DRB and a downlink processing attribute, a target downlink processing attribute corresponding to the target DRB, wherein the downlink processing attribute includes attributes indicating whether a non-access stratum (NAS) reflective quality of service (QoS) function is supported, and whether an access stratum (AS) reflective quality of service (QoS) function is supported;

encapsulate the downlink data packet with adding a service data adaptation protocol (SDAP) header when the target downlink processing attribute is the attribute of supporting the NAS reflective QoS function or the AS reflective QoS function; and encapsulate the downlink data packet without adding an SDAP header when the target downlink processing attribute is the attribute of neither supporting the NAS reflective QoS function nor the AS reflective QoS function; and send the encapsulated downlink data packet to a terminal.

An exemplary embodiment of the present disclosure provides a terminal capable of implementing a downlink data packet configuration method provided in the present disclosure. The terminal includes a processor, and a memory for storing a processor-executable instruction.

The processor is configured to:

receive a downlink data packet sent by a base station;

determine, according to a pre-configured correspondence between a DRB and a downlink processing attribute, a target downlink processing attribute corresponding to a target DRB which transmits the downlink data packet, wherein the downlink processing attribute includes attributes indicating whether a non-access stratum (NAS) reflective quality of service (QoS) function is supported, and whether an access stratum (AS) reflective quality of service (QoS) function is supported;

determine that the downlink data packet is encapsulated with an SDAP header when the target downlink processing attribute is the attribute of supporting the NAS reflective QoS function or the AS reflective QoS function, and determine that the downlink data packet is encapsulated without an SDAP header when the target downlink processing attribute is the attribute of neither supporting the NAS reflective QoS function nor the AS reflective QoS function; and process the downlink data packet based on whether the downlink data packet is encapsulated with the SDAP header as determined.

Figure 8:
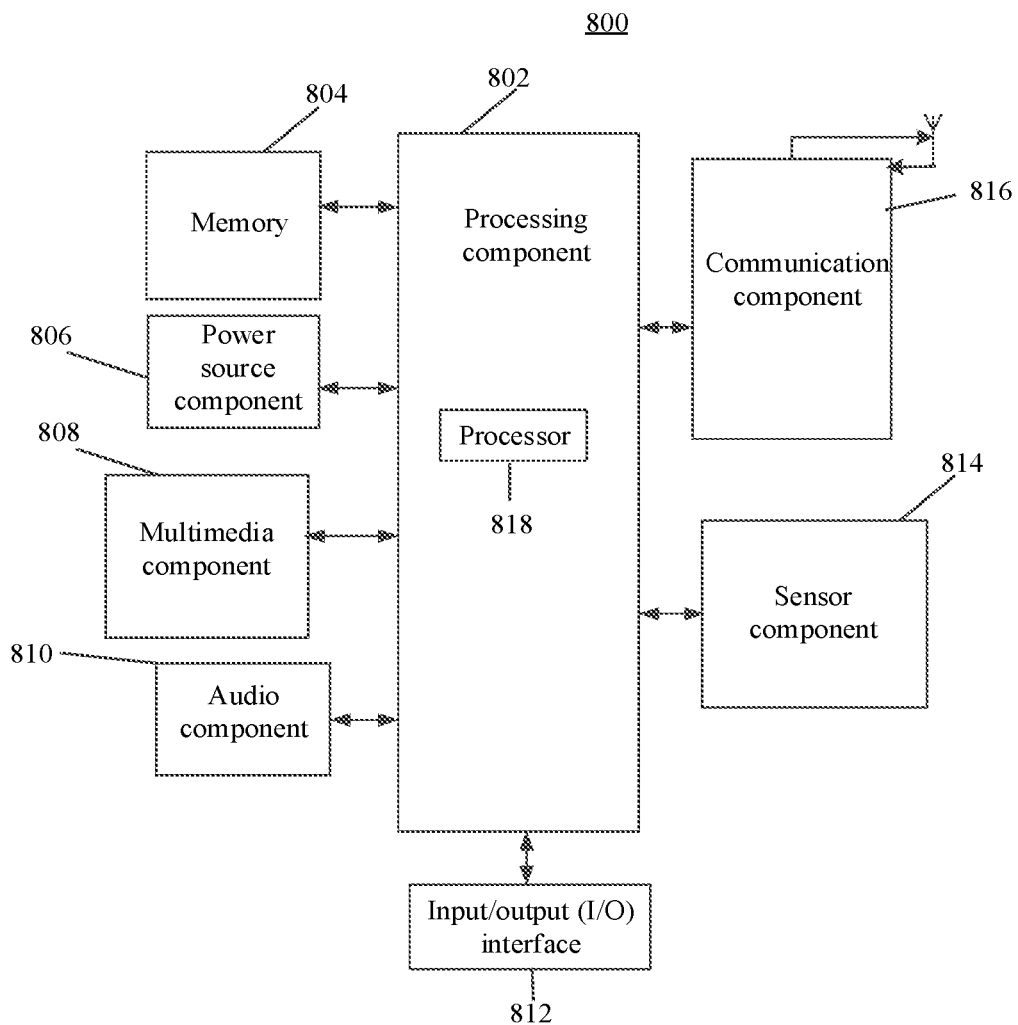
FIG. 8 is a block diagram of a terminal shown according to an exemplary embodiment.

FIG. 8 is a block diagram of a terminal shown according to an exemplary embodiment. The terminal 800 may be implemented as the terminal 120 in FIG. 1. For example, the terminal 800 may be a mobile phone, a computer, a digital broadcast terminal, a message transceiving device, a game console, a tablet device, a medical device, a fitness device, a personal digital assistant or the like.

With reference to FIG. 8, the terminal 800 may include one or more of following components: a processing component 802, a memory 804, a power source component 806, a multimedia component 808, an audio component 810, an input/output (I/O) interface 812, a sensor component 814, and a communication component 816.

The processing component 802 usually controls the overall operation of the terminal 800, such as operations associated with display, telephone call, data communication, camera operation, and recording operation. The processing component 802 may include one or more processors 818 to execute instructions so as to complete all or parts of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the terminal 800. The examples of these data include an instruction of any application or method operated on the terminal 800, contact person data, telephone book data, a message, a picture, a video and the like. The memory 804 may be implemented by any type of a volatile storage device or a non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

The power source component 806 provides power for various assemblies of the terminal 800. The power source component 806 may include a power source management system, one or more power sources, and other components associated with generation, management and distribution of power for the terminal 800.

The multimedia component 808 includes a screen that provides an output interface and is located between the terminal 800 and a user. In some embodiments, the screen may include a liquid crystal display (LCD) and a touch panel (TP). When the screen includes the touch panel, the screen may be implemented as a touch screen so as to receive an input signal from the user. The touch panel includes one or more touch sensors to sense touch, sliding and a gesture on the touch panel. The touch sensor may not only sense a boundary of a touch or sliding action, but also detect the duration and pressure which are related to the touch or sliding operation. In some embodiments, the multimedia component 808 includes a front-facing camera and/or a back-facing camera. When the terminal 800 is in an operation mode, such as a shooting mode or a video mode, the front-facing camera and/or the back-facing camera may receive external multimedia data. Each of the front-facing camera and the back-facing camera may be a fixed optical lens system or has a focal length and an optical zooming capacity.

The audio component 810 is configured to output and/or input an audio signal. For example, the audio component 810 includes a microphone (MIC). The microphone is configured to receive an external audio signal when the terminal 800 is in the operation mode, such as a call mode, a recording mode, and a voice recognition mode. The received audio signal may be further stored in the memory 804, or sent via the communication component 816. In some embodiments, the audio component 810 further includes a loudspeaker for outputting the audio signal.

The I/O interface 812 is an interface provided between the processing component 802 and a peripheral interface module which may be a keyboard, a click wheel, a button or the like. These buttons include, but are not limited to: a homepage button, a volume button, a start button, and a locking button.

The sensor component 814 includes one or more sensors for providing the terminal 800 with state assessment of various aspects. For example, the sensor component 814 may detect an opening/closing state of the terminal 800, and relative positioning of the component, such as the display and a small keypad of the terminal 800. The sensor component 814 may also detect a position change of the terminal 800 or one component of the terminal 800, whether the user contacts the terminal 800, an orientation and/or acceleration/deceleration of the terminal 800 and a temperature change of the terminal 800. The sensor component 814 may include a proximity sensor configured to detect the presence of nearby objects without any physical contact. The sensor component 814 may further include an optical sensor, such as a CMOS or CCD image sensor used in an imaging application. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the terminal 800 and other devices. The terminal 800 may access a wireless network based on a communication standard, such as Wi-Fi, 2G or 3G, or a combination thereof. In an exemplary embodiment, the communication component 816 receives a broadcast signal or broadcast-related information from an external broadcast management system via a broadcast channel. In an exemplary embodiment, the communication component 816 includes a near-field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an exemplary embodiment, the terminal 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, other electronic units for executing he downlink data packet configuration method provided in various method embodiments.

In an exemplary embodiment, further provided is a non-transitory computer-readable storage medium including an instruction, such as a memory 804 including an instruction. The above instruction may be executed by the processor 818 of the terminal 800 to complete the above downlink data packet configuration method. For example, the non-temporary computer-readable storage medium may be an ROM, a random-access memory (RAM), a CD-ROM, a magnetic tape, a floppy disk, an optical data storage device or the like.

Figure 9:
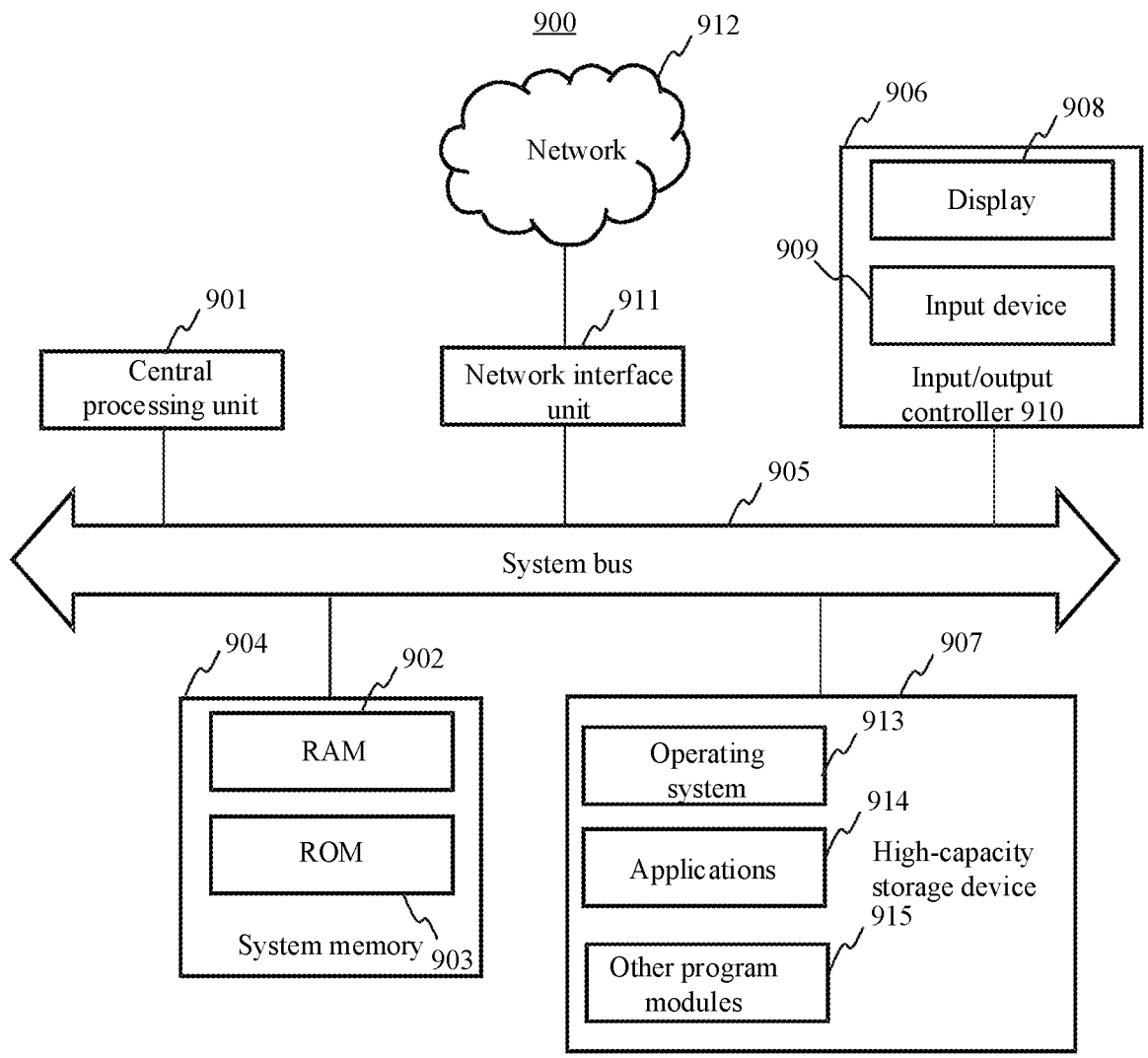
FIG. 9 is a block diagram of a base station shown according to an exemplary embodiment.

FIG. 9 is a block diagram of a base station shown according to an exemplary embodiment. The base station 900 may be implemented as the base station 140 in FIG. 1. Specifically, the base station 900 includes a central processing unit (CPU) 901, a system memory 904 including a random-access memory (RAM) 902 and a read-only memory (ROM) 903, and a system bus 905 connecting the system memory 904 and the central processing unit 901. The base station 900 further includes a basic input/output system (I/O system) 906 which helps transmit information between various components within a computer, and a high-capacity storage device 907 for storing an operating system 913, an application 914 and other program modules 915.

The basic input/output system 906 includes a display 908 for displaying information and an input device 909, such as a mouse and a keyboard, for inputting information by the user. Both the display 908 and the input device 909 are connected to the central processing unit 901 through an input/output controller 910 connected to the system bus 905. The basic input/output system 906 may also include the input/output controller 910 for receiving and processing input from a plurality of other devices, such as the keyboard, the mouse, or an electronic stylus. Similarly, the input/output controller 910 further provides output to the display, a printer or other types of output devices.

The high-capacity storage device 907 is connected to the central processing unit 901 through a high-capacity storage controller (not shown) connected to the system bus 905. The high-capacity storage device 907 and a computer-readable medium associated therewith provide non-volatile storage for the base station 900. That is, the high-capacity storage device 907 may include the computer-readable medium (not shown), such as a hard disk or a CD-ROM driver.

Without loss of generality, the computer-readable medium may include a computer storage medium and a communication medium. The computer storage medium includes volatile and non-volatile, removable and non-removable media implemented in any method or technology for storage of information such as a computer-readable instruction, a data structure, a program module or other data. The computer storage medium includes an RAM, an ROM, an EPROM, an EEPROM, a flash memory or other solid-state storage technologies; a CD-ROM, DVD or other optical storage; and a tape cartridge, a magnetic tape, a disk storage or other magnetic storage devices. Of course, it will be known by a person skilled in the art that the computer storage medium is not limited to above. The above system memory 904 and the high-capacity storage device 907 may be collectively referred to as the memory.

According to various embodiments of the present disclosure, the base station 900 may also be connected to a remote computer on a network through the network, such as the Internet, for operation. That is, the base station 900 may be connected to the network 912 through a network interface unit 911 connected to the system bus 905, or may be connected to other types of networks or remote computer systems (not shown) with the network interface unit 911.

The memory further includes one or more programs which are stored in the memory, and contain an instruction to perform the downlink data packet configuration method provided in the embodiment of the present disclosure. It may be understood by an ordinary person skilled in the art that all or part of steps in the downlink data packet configuration method in the above embodiments may be completed by a program instructing relevant hardware. The program may be stored in a computer-readable storage medium which includes a read-only memory (ROM), a random access memory (RAM), a magnetic disk, an optical disc or the like.

In an exemplary embodiment, further provided is a non-transitory computer-readable storage medium including an instruction, such as a memory 904 including an instruction. The above instruction may be executed by the processor 918 of the user equipment 900 to complete the above downlink data packet configuration method. For example, the non-temporary computer-readable storage medium may be an ROM, a random-access memory (RAM), a CD-ROM, a magnetic tape, a floppy disk, an optical data storage device or the like.

It should be understood that as used herein, the singular forms "a", "an" and "the" are intended to include the plural forms as well, unless the context clearly indicates otherwise. It should also be understood that the term "and/or" used herein means that any or all possible combinations of one or more items listed in an associated manner.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A downlink data packet configuration method applied to a base station, comprising:
   determining a target data radio bearer (DRB) corresponding to a downlink data packet to be sent;
   determining, according to a pre-configured correspondence between a DRB and a downlink processing attribute, a target downlink processing attribute corresponding to the target DRB, wherein the downlink processing attribute comprises attributes indicating whether a non-access stratum (NAS) reflective quality of service (QoS) function is supported, and whether an access stratum (AS) reflective quality of service (QoS) function is supported;
   encapsulating the downlink data packet by adding a service data adaptation protocol (SDAP) header when determining that the target downlink processing attribute indicates supporting the NAS reflective QoS function or the AS reflective QoS function;
   encapsulating the downlink data packet without adding an SDAP header when determining that the target downlink processing attribute indicates no support for both the NAS reflective QoS function and the AS reflective QoS function; and
   sending the encapsulated downlink data packet to a terminal.

2. The method according to claim 1, wherein the encapsulating the downlink data packet with adding the SDAP header comprises:
   when determining that the target downlink processing attribute indicates supporting the NAS reflective QoS function, encapsulating the downlink data packet by adding the SDAP header and adding an RQI field and a QoS flow ID (QFI) field in the SDAP header; and
   when determining that the target downlink processing attribute indicates only supporting the AS reflective QoS function, encapsulating the downlink data packet by adding the SDAP header and adding indication information and a QFI field in the SDAP header, wherein the indication information indicates whether the SDAP header contains a QFI.

3. The method according to claim 1, wherein prior to sending the downlink data packet to the terminal, the method further comprises:
   sending the correspondence between the DRB and the downlink processing attribute to the terminal, and storing, by the terminal, the correspondence between the DRB and the downlink processing attribute.

4. The method according to claim 1, wherein prior to sending the encapsulated downlink data packet to the terminal, the method further comprises:
   acquiring a correspondence between a QFI and the downlink processing attribute; and
   sending the correspondence between the QFI and the downlink processing attribute to the terminal, and storing, by the terminal, the correspondence between the QFI and the downlink processing attribute.

5. The method according to claim 4, further comprising:
   when the terminal switches to a target base station, sending first configuration information corresponding to the terminal to the target base station, wherein the first configuration information comprises the correspondence between the QFI and the downlink processing attribute, and/or the correspondence between the DRB and the downlink processing attribute; and
   receiving second configuration information which is set by the target base station according to the first configuration information, sending the second configuration information to the terminal, and storing, by the terminal, the second configuration information, wherein
   the second configuration information comprises a correspondence between the QFI and the downlink processing attribute, which corresponds to the target base station, and a correspondence between the DRB and the downlink processing attribute, which corresponds to the target base station.

6. A downlink data packet configuration method applied to a terminal, comprising:
   receiving a downlink data packet sent by a base station;
   determining, according to a pre-configured correspondence between a DRB and a downlink processing attribute, a target downlink processing attribute corresponding to a target DRB which transmits the downlink data packet, wherein the downlink processing attribute comprises attributes indicating whether a non-access stratum (NAS) reflective quality of service (QoS) function is supported, and whether an access stratum (AS) reflective quality of service (QoS) function is supported;
   determining that the downlink data packet is encapsulated with an SDAP header when the target downlink processing attribute is an attribute of supporting the NAS reflective QoS function or the AS reflective QoS function;
   determining that the downlink data packet is encapsulated without an SDAP header when the target downlink processing attribute is an attribute of neither supporting the NAS reflective QoS function nor the AS reflective QoS function; and
   processing the downlink data packet based on whether the downlink data packet is encapsulated with an SDAP header as determined.

7. The method according to claim 6, wherein when determining that the downlink data packet is encapsulated with an SDAP header, the processing the downlink data packet comprises:
   parsing the SDAP header of the downlink data packet;
   processing the downlink data packet in an NAS when the SDAP header carries an RQI field and a QFI field; and
   processing the downlink data packet in an AS when the SDAP header carries indication information and an QFI field, wherein the indication information indicates whether the SDAP header contains a QFI.

8. The method according to claim 4, wherein prior to receiving a downlink data packet sent by a base station, the method further comprises:
   receiving the correspondence between the DRB and the downlink processing attribute sent by the base station, and storing the correspondence between the DRB and the downlink processing attribute.

9. The method according to claim 6, wherein prior to receiving a downlink data packet sent by a base station, the method further comprises:
   receiving and storing a correspondence between a QFI and a downlink processing attribute sent by the base station; and
   when it is determined that the downlink data packet is encapsulated with an SDAP header, the processing the downlink data packet comprises:
   parsing the SDAP header of the downlink data packet to obtain a QFI field carried in the SDAP header; and according to the correspondence between the QFI and the downlink processing attribute, determining a downlink processing attribute corresponding to the QFI carried in the SDAP header;

when the downlink processing attribute corresponding to the QFI is an attribute of supporting the NAS reflective QoS function, processing the downlink data packet in the NAS; and when the downlink processing attribute corresponding to the QFI is an attribute of supporting the AS reflective QoS function, processing the downlink data packet in the AS.

10. The method according to claim 9, further comprising:
receiving and storing second configuration information sent by the base station, wherein the second configuration information is information obtained from a target base station after the base station sends, when a pre-determined condition is met, first configuration information corresponding to the terminal to the target base station, wherein the first configuration information comprises the correspondence between the QFI and the downlink processing attribute, and/or the correspondence between the DRB and the downlink processing attribute, and the second configuration information at least comprises a correspondence between the QFI and the downlink processing attribute, which corresponds to the target base station, and a correspondence between the DRB and the downlink processing attribute, which corresponds to the target base station.

11. A terminal, comprising a processor, and a memory having stored therein at least one instruction, at least one program, a code set or an instruction set, which is loaded and executed by the processor to implement the downlink data packet configuration method according to claim 6.

12. The terminal according to claim 11, wherein when determining that the downlink data packet is encapsulated with an SDAP header, processing the downlink data packet comprises:
parsing the SDAP header of the downlink data packet;
processing the downlink data packet in an NAS when the SDAP header carries an RQI field and a QFI field; and
processing the downlink data packet in an AS when the SDAP header carries indication information and an QFI field, wherein the indication information indicates whether the SDAP header contains a QFI.

13. The terminal according to claim 11, wherein prior to receiving a downlink data packet sent by a base station, the at least one instruction, at least one program, a code set or an instruction set, when executed, further cause the processor to:
receive the correspondence between the DRB and the downlink processing attribute sent by the base station, and store the correspondence between the DRB and the downlink processing attribute.

14. The terminal according to claim 11, wherein prior to receiving a downlink data packet sent by a base station, the at least one instruction, at least one program, a code set or an instruction set, when executed, further cause the processor to:
receive and store a correspondence between a QFI and a downlink processing attribute sent by the base station; and
when it is determined that the downlink data packet is encapsulated with an SDAP header, the processing the downlink data packet comprises:

parsing the SDAP header of the downlink data packet to obtain a QFI field carried in the SDAP header; and
according to the correspondence between the QFI and the downlink processing attribute, determining a downlink processing attribute corresponding to the QFI carried in the SDAP header;

when the downlink processing attribute corresponding to the QFI is an attribute of supporting the NAS reflective QoS function, processing the downlink data packet in the NAS; and when the downlink processing attribute corresponding to the QFI is an attribute of supporting the AS reflective QoS function, processing the downlink data packet in the AS.

15. The terminal according to claim 14, the at least one instruction, at least one program, a code set or an instruction set, when executed, further cause the processor to:
receive and store second configuration information sent by the base station, wherein the second configuration information is information obtained from a target base station after the base station sends, when a predetermined condition is met, first configuration information corresponding to the terminal to the target base station, wherein the first configuration information comprises the correspondence between the QFI and the downlink processing attribute, and/or the correspondence between the DRB and the downlink processing attribute, and the second configuration information at least comprises a correspondence between the QFI and the downlink processing attribute, which corresponds to the target base station, and a correspondence between the DRB and the downlink processing attribute, which corresponds to the target base station.

16. A base station, comprising a processor, and a non-transitory storage having stored therein at least one instruction, at least one program, a code set or an instruction set, when executed, causing the processor to:
determine a target data radio bearer (DRB) corresponding to a downlink data packet to be sent;
determine, according to a pre-configured correspondence between a DRB and a downlink processing attribute, a target downlink processing attribute corresponding to the target DRB, wherein the downlink processing attribute comprises attributes indicating whether a non-access stratum (NAS) reflective quality of service (QoS) function is supported, and whether an access stratum (AS) reflective quality of service (QoS) function is supported;
encapsulate the downlink data packet by adding a service data adaptation protocol (SDAP) header when determining that the target downlink processing attribute indicates supporting the NAS reflective QoS function or the AS reflective QoS function;
encapsulate the downlink data packet without adding an SDAP header when determining that the target downlink processing attribute indicates no support for both the NAS reflective QoS function and the AS reflective QoS function; and
send the encapsulated downlink data packet to a terminal.

17. The base station according to claim 16, wherein the processor encapsulates the downlink data packet with adding the SDAP header by performing acts comprising:
when determining that the target downlink processing attribute indicates supporting the NAS reflective QoS function, encapsulating the downlink data packet by adding the SDAP header and adding an RQI field and a QoS flow ID (QFI) field in the SDAP header; and when determining that the target downlink processing attribute indicates only supporting the AS reflective QoS function, encapsulating the downlink data packet by adding the SDAP header and adding indication information and a QFI field in the SDAP header, wherein the indication information indicates whether the SDAP header contains a QFI.

18. The base station according to claim 16, wherein prior to sending the downlink data packet to the terminal, the at least one instruction, at least one program, a code set or an instruction, when executed, further cause the processor to:
send the correspondence between the DRB and the downlink processing attribute to the terminal, and store, by the terminal, the correspondence between the DRB and the downlink processing attribute.

19. The base station according to claim 16, wherein prior to sending the encapsulated downlink data packet to the terminal, the at least one instruction, at least one program, a code set or an instruction set, when executed, further cause the processor to:
acquire a correspondence between a QFI and the downlink processing attribute; and
send the correspondence between the QFI and the downlink processing attribute to the terminal, and store, by the terminal, the correspondence between the QFI and the downlink processing attribute.

20. The base station according to claim 19, wherein the at least one instruction, at least one program, a code set or an instruction set, when executed, further cause the processor to:
when the terminal switches to a target base station, send first configuration information corresponding to the terminal to the target base station, wherein the first configuration information comprises the correspondence between the QFI and the downlink processing attribute, and/or the correspondence between the DRB and the downlink processing attribute; and
receive second configuration information which is set by the target base station according to the first configuration information, send the second configuration information to the terminal, and store, by the terminal, the second configuration information, wherein
the second configuration information comprises a correspondence between the QFI and the downlink processing attribute, which corresponds to the target base station, and a correspondence between the DRB and the downlink processing attribute, which corresponds to the target base station.

\* \* \* \* \*